United States Patent [19]

Soderquist et al.

[11] Patent Number: 4,640,786

[45] Date of Patent: Feb. 3, 1987

[54] PHOSPHONIUM SALT-CONTAINING CORROSION INHIBITORS FOR HIGH DENSITY BRINES

[75] Inventors: Mark E. Soderquist; Ramaiah Muthyala; William A. Larson; Peter A. Doty, all of Midland, Mich.

[73] Assignee: The Dow Chemical Company, Midland, Mich.

[21] Appl. No.: 538,451

[22] Filed: Oct. 3, 1983

[51] Int. Cl.$^4$ .................. C09K 7/02; C23F 11/04; C23F 11/167

[52] U.S. Cl. .................. 252/8.551; 252/8.555; 422/12; 422/15

[58] Field of Search .................. 252/8.55 E, 8.55 R, 252/147, 389 A; 422/12, 15

[56] References Cited

U.S. PATENT DOCUMENTS

| | | | |
|---|---|---|---|
| 1,921,364 | 8/1933 | Lommel et al. | 568/9 |
| 2,073,413 | 3/1937 | Cross | 252/8.5 B |
| 2,224,695 | 12/1940 | Prutton | 148/6.15 R |
| 2,265,759 | 12/1941 | Lawton et al. | 252/8.55 C |
| 2,340,996 | 2/1944 | Smyers | 106/14.31 |
| 2,360,623 | 10/1944 | Rosen | 252/49.9 |
| 3,060,156 | 10/1962 | Rassweller et al. | 525/329.4 |
| 3,165,513 | 1/1965 | D'Alelio | 544/195 |
| 3,271,148 | 9/1966 | Whitmore | 430/213 |
| 3,334,144 | 8/1967 | Grisley, Jr. | 546/351 |
| 3,380,837 | 4/1968 | Wagner et al. | 106/14.12 |
| 3,531,514 | 9/1970 | Redmore | 560/129 |
| 3,591,330 | 7/1971 | Redmore | 422/7 |
| 3,654,300 | 4/1972 | Redmore | 548/112 |
| 3,664,807 | 5/1972 | Redmore | 422/7 |
| 3,790,487 | 2/1974 | Burrous | 252/78.5 |
| 4,100,099 | 7/1978 | Asperger et al. | 252/189 |
| 4,100,100 | 7/1978 | Clouse et al. | 252/189 |
| 4,102,804 | 7/1978 | Clouse et al. | 252/189 |
| 4,163,771 | 8/1979 | Redmore et al. | 422/16 |
| 4,292,183 | 9/1981 | Sanders | 252/8.55 R |
| 4,304,677 | 12/1981 | Stauffer et al. | 252/8.55 R |
| 4,536,302 | 8/1985 | Augsburger | 252/8.55 R |

FOREIGN PATENT DOCUMENTS 2086923  5/1982  United Kingdom.

OTHER PUBLICATIONS

Hudgins, C. M. et al., "Heavy Brine Makes Good Fluid for Completion Packer", *The Oil & Gas Journal*, Jul. 24, 1961, pp. 91–96.

Horner & Rottger, *Werkstoffe und Kerrosion*, vol. 15, pp. 228–232 (1964).

Chemical Abstract, 51:3413g.

Chemical Abstract, 93:248190w.

Chemical Abstract, 90:38163b.

Chemical Abstract, 51:6531c.

Chemical Abstract, 47:10123b.

Chemical Abstract, 44:9912c.

B. Sanyal, K. Srivastava; *Br. Corros.*, J. #2, 103 (1974), (Quarterly).

L. Horner et al., *Werkstoffe und Kerrosion*, 22, 924 (1971), and *Werkstoffe und Kerrosion*, 23, 9 (1972).

M. Troquet et al., Ann. Univ. Ferrara Sez. 5 Suppl., "Eur. Symp. Corrosion Inhibitors 5th," 3, Series 7, p. 921 (1980).

Chemical Abstract, 64:289h.

*Primary Examiner*—Dennis L. Albrecht
*Attorney, Agent, or Firm*—Paul D. Hayhurst

[57] ABSTRACT

Compositions useful as corrosion inhibitors for high density brines at high temperatures comprise phosphonium salts, such as triphenyldocosyl phosphonium chloride.

28 Claims, No Drawings

PHOSPHONIUM SALT-CONTAINING CORROSION INHIBITORS FOR HIGH DENSITY BRINES

BACKGROUND OF THE INVENTION

The present invention relates to corrosion inhibitor compositions. More specifically, it relates to corrosion inhibitor compositions for use with high density brines.

In many wells, e.g., oil, gas, etc., it may be desirable to contain the formation pressure by employing a hydrostatic head. This may be needed during the squeezing of sand consolidation compositions, during perforation operations, during well shut-ins, during gravel packing, or the like. Many well-servicing fluids, sometimes referred to as completion or packer fluids, have been employed. These include, for example, drilling muds, salt water, brines, water, oil, $ZnCl_2$-$CaCl_2$ solutions, $CaCl_2$-$CaBr_2$ solutions and the like.

In recent years, deeper, high-pressure wells have resulted in a need for solids-free, well-servicing fluids having higher densities than are currently available. This is particularly true of wells in the Gulf of Mexico (offshore Louisiana), where higher hydrostatic pressures often require well-servicing fluids having densities in excess of 15 pounds per gallon (ppg). The need for solids-free, higher density well-servicing fluids is met by brines which contain zinc salts, such as zinc halides. These zinc-containing brines have the disadvantage of being more corrosive than brines which are substantially free of zinc salts. Therefore, the high density brines, i.e., those brines having densities greater than about 14.5 ppg, are especially corrosive to oil well casings and equipment used in the service of said casings. The corrosion problem is exacerbated by the higher temperatures typically found in the deeper wells in which high density brines are used. Known corrosion inhibitors, such as film-forming amines, which have been used in high density brines do not provide adequate protection from corrosion at the higher temperatures associated with the deep wells in which high density brines typically are employed. Therefore, it would be desirable to develop a corrosion inhibiting agent which provides increased protection for metals from corrosion caused by high density brines, especially by zinc-salt-containing high density brines at the higher temperatures found in deep wells.

SUMMARY OF THE INVENTION

The present invention is such a corrosion inhibiting agent which provides high temperature corrosion protection for metals which come in contact with high density brines. In one aspect, the present invention is a composition which comprises (1) a high density brine and (2) a corrosion-inhibiting amount of an agent comprising at least one phosphonium salt. In another aspect, the present invention is a process of inhibiting corrosion of metals which are in contact with a high density brine, which comprises dissolving in the brine an agent comprising at least one phosphonium salt.

Surprisingly, the composition of the present invention may provide increased corrosion protection when employed with high density brines in deep well applications having temperatures exceeding about 250° F. Further, the practice of the present invention unexpectedly reduces the pitting of metals contacted with a high density brine.

DETAILED DESCRIPTION OF THE INVENTION

The corrosion inhibiting agent of the present invention can be employed to reduce the corrosive effects of high density brines upon metals. Metals which typically come in contact with high density brines include steel, iron, and ferrous alloys, with steel being most common as it is widely used in the oil and gas industry. The agents of the present invention are particularly effective in reducing the corrosion rate of steel which is contacted with high density brines.

The high density brines employed in the present invention include all brines which contain salts of zinc. Generally, the high density brines are aqueous solutions of certain halides of calcium or certain halides of zinc, or mixtures of calcium halides and zinc halides. See, e.g., U.S. Pat. Nos. 4,304,677 and 4,292,183 for references to high density brines and their preparation. Said patents are incorporated herein by reference. The corrosion inhibitor systems of the present invention are preferably employed in those brines having a density greater than about 14.5 ppg.

The phosphonium salts employed in the present invention inhibit the corrosive properties of high density brines toward metals, especially iron and steel. Typical phosphonium salts are represented generally by the formula:

$R_aP^+(R')_bX^-$ wherein "a" is 0, 1, or 2; b is the quantity (4−a); R is an electron-withdrawing or electron-donating moiety; each R' is independently a saturated or unsaturated hydrocarbyl moiety; and X⁻ is an anion. Preferably, b is 3; X is halo or an organic anion; R is alkyl, alkenyl or alkynyl; and R' is aryl. More preferably, R is alkyl, alkenyl or alkynyl having from 1 to about 30 carbon atoms and R' is a carbocyclic aromatic moiety.

Especially preferred phosphonium salts are represented generally by the formula:

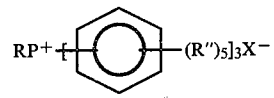

$RP^+[\phantom{X}(R'')_5]_3 X^-$ wherein R is alkyl of from about 16 to about 30 carbon atoms; R" may be independently H, alkyl, nitro, alkoxy and the like; and X⁻ is as defined hereinbefore. For the most preferred phosphonium salts, R is alkyl of from about 16 to about 22 carbon atoms; R" is H; and X⁻ is Cl, Br or I, or an organic anion such as thiocyanate, tosylate, perchlorate, mesylate and the like, with Cl, Br, I and thiocyanate being most preferred.

For the purposes of the present invention, the terms "aryl" and "aromatic" include substituted aryl and substituted aromatic moieties. For example, in addition to phenyl substituents, the phosphonium salt employed in the present invention may include substituents such as, for example, methyl phenyl, dimethyl phenyl, ethyl phenyl, tosyl and the like. Similarly, the terms "hydrocarbyl", "alkyl", "alkenyl" and "alkynyl" include the substituted derivatives thereof. For example, R may be hydroxyl-substituted, as when R is —C≡C—C—OH. Other substituents include amino, alkoxy and halo.

The phosphonium salts employed in the present invention may be used in high density brines either alone or as mixtures. They may be used in combination with a promoter. For the purposes of the present invention, the term "promoter" refers to a material which, when employed with at least one of the phosphonium salts described hereinabove, provides greater corrosion protection than does the phosphonium salt composition alone. Typical promoters include alkynols, such as 2-butyn-1,4-diol and 2-propyn-1-ol, and certain sulfur-containing compounds, such as thiocyanates and thiourea. Preferred promoters include 2-propyn-1-ol, thiourea and ammonium thiocyanate, with ammonium thiocyanate being most preferred.

The corrosion inhibitors of the present invention are dissolved in the high density brines either directly or after dissolving the inhibitors in a solvent, such as water. The inhibited brine is then ready for down-hole use, such as in drilling, completion and workover applications. Known additives, such as surfactants, may be employed in conjunction with the phosphonium salts and promoters of the present invention. A surfactant typically is employed in order to increase the solubility of the corrosion inhibitor composition in the high density brine. Examples of preferred surfactants include the polyethoxylated quaternary ammonium salts, such as methyl bis(2-hydroxyethyl)oleyl ammonium chloride.

The promoters and phosphonium salts of the present invention may be employed in any quantity at which they inhibit corrosion. Depending upon the conditions to be encountered in a given well, and depending on the degree of protection desired, the phosphonium salt, or mixture of salts, may be employed in the absence of a promoter. Whether used in the absence or presence of a promoter, the phosphonium salts are typically employed in a concentration of at least about 200 ppm, based on the weight of the brine/phosphonium salt/promoter system. Preferably, the phosphonium salts are employed in concentrations ranging from about 200 ppm to about 5000 ppm. Similarly, if a promoter is employed, said promoter typically is employed at a concentration of at least about 100 ppm. Preferably, the promoter concentration is at least about 1000 ppm.

The compositions of the present invention may be employed at any temperature and pressure at which they provide some degree of inhibition of corrosion. Typically, the compositions are employed in applications where the temperature is from about 72° F. to about 400° F. At higher temperatures, corrosion protection may be reduced. The compositions of the present invention are especially useful at temperatures ranging from about 200° F. to about 350° F.

SPECIFIC EMBODIMENTS

The following preparations and examples are given to illustrate the invention and should not be construed as limiting its scope. All parts and percentages are by weight unless otherwise indicated.

Preparation of Triarylalkyl Phosphonium Salts

General Procedure:

Triphenylphosphine (1 eq.) and alkyl bromide (1 eq.) are heated at 120° C. to 130° C. for 6–8 hours under a nitrogen atmosphere. The entire slurry becomes homogeneous and then solidifies by the end of the reaction time to a gummy mass. The reaction mixture is dissolved in chloroform and is precipitated with diethyl ether to give a white precipitate which is filtered on a sintered glass funnel. The resulting precipitate is analyzed and the compound is determined.

Specific Compounds:

The results of four runs using the general procedure outlined above are reported in Table I.

TABLE I

| Compound | MP ° C. | Analysis Calc. | Analysis Obs. |
|---|---|---|---|
| $C_{16}H_{33}\,P^+\,Ph_3\,Br^-$ | 97–100 | C −71.9 | C −71.8 |
|  |  | H −8.52 | H −8.4 |
|  |  | Br −14.1 | Br −14.3 |
| $C_{18}H_{37}\,P^+\,Ph_3\,Br^-$ | 102–105 | C −72.78 | C −72.6 |
|  |  | H −8.80 | H −8.78 |
|  |  | Br −13.4 | Br −13.5 |
| $C_{20}H_{41}\,P^+\,Ph_3\,Br^-$ | 103–105 | C −73.17 | C −73.1 |
|  |  | H −9.05 | H −9.07 |
|  |  | Br −12.8 | Br −12.8 |
| $C_{22}H_{45}\,P^+\,Ph_3\,Br^-$ | 106–108 | C −73.71 | C −73.9 |
|  |  | H −9.28 | H −9.04 |
|  |  | Br −12.3 | Br −12.5 |

Corrosion Testing

General Procedure:

A test aqueous solution (500 ml) of uninhibited $ZnBr_2/CaBr_2$ brine having a density of 19.2 ppg is vigorously mixed at 158° F. with a phosphonium salt and optionally with a promoter until a solution is formed. The solution is then cooled to room temperature.

Coupons of 1018 mild steel, with dimensions of $1''\times 1''\times \frac{1}{8}''$ (5/16" diameter center hole for mounting) are prepared by scrubbing with soap, then rinsing with tap water then with deionized water and finally with acetone. The coupons are dried and then weighed. The exposed area is about 2.5 square inches.

The corrosion test is done in a Parr 4521, one-liter bomb, with 500 ml of test solution. The coupons are mounted on a Teflon sheathed threaded rod fixed to the head of the bomb. With the test solution and coupons in place, the bomb is sealed, vacuum degassed, and nitrogen padded. The system is then allowed to stand overnight at room temperature.

The bomb is heated to 320° F. and agitated for eight hours. The initiation of heating constitutes the start of the test. The agitator is turned off overnight, but is periodically turned on throughout the test, usually being run on the average of one-fourth of the total time of the test.

At the end of the test, the heater is turned off and the bomb is cooled to 150° F.–160° F. then vented and opened. The coupons are transferred to cold water and are cleaned ultrasonically for 5 minutes. The coupons are scrubbed with soap, rinsed with deionized water and then acetone rinsed. The coupons are weighed after drying. The rate of corrosion is calculated using the following equation:

$$\text{Corrosion rate in mils/year } (mpy) = \frac{1133 \text{ weight loss (g)}}{\text{Test length (days)}}.$$

The percent protection is calculated using the following equation:

$$\% \text{ Protection} = \frac{(CB - CTC) \times 100}{CB}$$

wherein CB=corrosion rate of blanks and CTC=corrosion rate of test coupons.

Example 1

Following the general corrosion testing procedure, the addition of 1.2 g of triphenylhexadecyl phosphonium chloride (1000 ppm) to the brine gives a test coupon corrosion rate of 1342 mpy for a test period of four days. The blank corrosion rate is approximately 3834 mpy. Thus, the percent protection is 65 percent. No pitting is observed on the test coupon.

Example 2

Following the general corrosion testing procedure, the addition of 1.2 g (1000 ppm) of triphenyleicosyl phosphonium chloride to the brine gives a test coupon corrosion rate of 1036 mpy and a percent protection of 73 percent for a test period of three days. The blank corrosion rate is approximately 3837 mpy. No pitting of the test coupon is observed.

EXAMPLE 3

Following the general corrosion testing procedure, the addition of 1.2 g (1000 ppm) of triphenyldocosyl phosphonium chloride to the brine gives a test coupon corrosion rate of 485 mpy and a percent protection of 88 percent for a test period of two days. The blank corrosion rate is approximately 4042 mpy. No pitting is observed on the test coupon.

Example 4

The procedure of Example 1 is repeated with the exception that 4.6 g (4000 ppm) of 2-propyn-1-ol (propargyl alcohol) is added as a promoter to the brine with the phosphonium salt. The corrosion rate is 785 mpy and the percent protection is 80 percent for a test period of five days. The blank corrosion rate is approximately 3925 mpy. No pitting is observed on the test coupon.

Example 5

The procedure of Example 4 is followed except that the promoter is ammonium thiocyanate and the phosphonium salt is triphenyldocosyl phosphonium chloride. The corrosion rate is 18 mpy for a test period of six days, the blank corrosion rate is approximately 3875 mpy. Thus the percent protection is 99.5. No pitting of the test coupon is observed.

Example 6

The general corrosion testing procedure is followed, except that the test temperature is 400° F. The inhibitor composition is triphenyldocosyl phosphonium bromide and 1000 ppm of ammonium thiocyanate. The corrosion rate is 122 mpy over a 6-day test period. The blank corrosion rate is not measured, but the brine employed is the same uninhibited brine employed in Comparative Experiment 3.

Comparative Experiments

Following the general procedure for corrosion testing, with exceptions being noted, some known corrosion inhibitors which are used in brines are tested. The results are reported in Table II.

TABLE II

| Run | Inhibitor[1] | Corrosion Rate (mpy) | Percent Protection | Test Period (days) | Test Temp (°F.) |
|---|---|---|---|---|---|
| CE1 | A | 1634 | 58.0* | 1 | 320 |
| CE2 | B | 58 | 98.5** | 5 | 320 |
| CE3 | A | 938 | *** | 6 | 400 |

[1]Inhibitor A is Tretolite KI-86 at a concentration of 1000 ppm. Tretolite KI-86 is a Mannich amine-based formulation available from the Tretolite Division of Petrolite Corporation. Inhibitor B is Ammonium Thiocyanate at a concentration of 4000ppm.
*The blank corrosion rate is approximately 3980 mpy.
**Extensive pitting of the test coupon is observed. Pitting leads to more rapid failure than would be expected from the corrosion rate number. The blank corrosion rate is approximately 3875 mpy.
***Not calculated; brine is the same uninhibited brine employed in Example 6.

Thus, it may be seen that the inhibitor formulations of Examples 1–5 all provide improved protection in 19.2 ppg brine at 320° F. when compared to Tretolite KI-86. The formulation of Example 5 provides exceptional protection.

Ammonium thiocyanate employed by itself as a corrosion inhibitor gives a very low corrosion rate number. However, the coupons which are subjected to ammonium thiocyanate alone are extensively pitted after the test. Pitting leads to a more rapid failure due to corrosion than would be expected from the corrosion rate number. Surprisingly, when ammonium thiocyanate is employed as a promoter in Example 5, no pitting is observed, and the corrosion rate is lower than when ammonium thiocyanate is used alone (Comparative Example 2) and is lower than when triphenyldocosyl phosphonium chloride is used alone (Example 3). Thus, the corrosion inhibitor compositions of the present invention are especially effective in reducing or eliminating the amount of pitting which would otherwise occur on a metal coupon.

As previously mentioned, the preceding examples serve only to illustrate the invention and its advantages, and they should not be interpreted as limiting since further modifications of the disclosed invention will be apparent to those skilled in the art. All such modifications are deemed to be within the scope of the invention as defined by the following claims.

What is claimed is:

1. A composition comprising:
   (a) a high density brine comprising ZnBr$_2$/CaBr$_2$; and
   (b) a corrosion-inhibiting amount of an agent comprising at least one phosphonium salt represented generally by the formula:

$$R_aP^+(R')_bX^-$$

wherein "a" is 0, 1 or 2; b is the quantity (4−a); R is alkyl, alkenyl or alkynyl, R' is a saturated or unsaturated hydrocarbyl moiety, and X$^-$ is an anion.

2. A composition of claim 1 wherein b is three and X is halo or an organic anion.

3. A composition of claim 2 wherein R' is aryl.

4. A composition of claim 3 wherein R has from 1 to about 30 carbon atoms; and R' is a carbocyclic aromatic moiety.

5. A composition of claim 2 wherein the phosphonium salt is represented generally by the formula:

wherein R is an alkyl, alkenyl or alkynyl moiety having from 1 to about 30 carbon atoms, and wherein R″ is independently H, alkyl, alkoxy, or nitro.

6. The composition of claim 5 wherein R is alkyl of from about 16 to about 30 carbon atoms, and R″ is H.

7. The composition of claim 6 wherein X⁻ is thiocyanate, Cl, Br or I.

8. The composition of claim 7 comprising triphenyldocosyl phosphonium chloride.

9. The composition of claim 1 further comprising a promoter selected from the group consisting of alkynols, thiocyanates, and thiourea, in an amount which provides greater corrosion protection than does the phosphonium salt composition alone.

10. The composition of claim 1 further comprising at least about 100 ppm of ammonium thiocyanate.

11. The composition of claim 1 comprising at least about 200 ppm of the phosphonium compound.

12. The composition of claim 11 wherein the phosphonium compound is present in an amount of from about 200 ppm to about 5000 ppm.

13. The composition of claim 1 further comprising at least about 1000 ppm of ammonium thiocyanate.

14. The composition of claim 11 comprising at least about 1000 ppm of ammonium thiocyanate.

15. An inhibited high density brine composition comprising:
(a) a ZnBr$_2$/CaBr$_2$ brine having a density of at least 15 ppg;
(b) a corrosion inhibiting amount of a corrosion inhibiting agent comprising ammonium thiocyanate and a triphenylalkyl phosphonium compound.

16. The composition of claim 15 wherein the uninhibited brine has a density of about 19.2 ppg.

17. The composition of claim 16 wherein the phosphonium halide is present in a concentration of at least about 200 ppm.

18. The composition of claim 17 wherein the ammonium thiocyanate concentration is at least about 1000 ppm.

19. The composition of claim 18 wherein the phosphonium halide is present in a concentration of from about 200 to about 5000 ppm.

20. The composition of claim 19 wherein the halide is chloride.

21. The composition of claim 15 consisting essentially of components (a) and (b).

22. A process of inhibiting corrosion of metals which are in contact with a high density brine which brine comprises ZnBr$_2$/CaBr$_2$, the process comprising dissolving in the brine a corrosion inhibiting agent comprising at least one phosphonium salt represented generally by the formula:

$$R_aP^+(R')_bX^-$$

wherein "a" is 0, 1 or 2; b is the quantity (4−a); R is alkyl, alkenyl or alkynyl, R′ is a saturated or unsaturated hydrocarbyl moiety, and X⁻ is a anion.

23. The process of claim 22 wherein the composition further comprises at least about 100 ppm of ammonium thiocyanate.

24. The process of claim 22 wherein the temperature of the metal, or a portion thereof, exceeds about 250° F.

25. The process of claim 22 wherein the temperature of the metal, or a portion thereof, is from about 72° F. to about 400° F.

26. The process of claim 22 wherein the temperature of the metal, or a portion thereof, is from about 200° F. to about 350° F.

27. A process of inhibiting corrosion of ferrous metals which are in contact with a specially manufactured ZnBr$_2$/CaBr$_2$ brine fluid having a density greater than 15 ppg, the process comprising dissolving in the brine fluid a corrosion-inhibiting amount of a corrosion-inhibiting agent, the agent comprising (1) a triphenyldocosyl phosphonium halide and (2) as a promoter, ammonium thiocyanate.

28. The process of claim 27 wherein the halide is chloride, the concentration of the phosphonium chloride is at least about 200 ppm, and the concentration of the promoter is at least about 100 ppm.

* * * * *